(12) United States Patent
Takei

(10) Patent No.: US 6,847,180 B2
(45) Date of Patent: Jan. 25, 2005

(54) MOTOR CONTROL APPARATUS AND MOTOR CONTROL METHOD

(75) Inventor: Toshiki Takei, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/435,444

(22) Filed: May 9, 2003

(65) Prior Publication Data

US 2004/0032235 A1 Feb. 19, 2004

(30) Foreign Application Priority Data

May 10, 2002 (JP) ........................................ 2002-136239

(51) Int. Cl.$^7$ .......................... G06F 13/28; G06F 15/00
(52) U.S. Cl. ...................... 318/567; 318/685; 318/696; 358/1.16; 710/22
(58) Field of Search .............................. 318/254, 569, 318/567, 439, 685, 696, 701, 625; 358/1.16; 710/22–28

(56) References Cited

U.S. PATENT DOCUMENTS

| | | | | |
|---|---|---|---|---|
| 5,574,351 A | * | 11/1996 | Jacobson et al. | 318/696 |
| 5,583,410 A | * | 12/1996 | Jacobson et al. | 318/696 |
| 6,563,282 B2 | * | 5/2003 | Morita | 318/567 |
| 6,563,285 B1 | * | 5/2003 | Eade et al. | 318/685 |
| 6,747,426 B2 | * | 6/2004 | Katsu et al. | 318/254 |

FOREIGN PATENT DOCUMENTS

| | | | |
|---|---|---|---|
| EP | 0 144 843 | 6/1985 | |
| EP | 1 154 382 | 11/2001 | |
| JP | 62118796 A | * 5/1987 | ............ H02P/8/00 |
| JP | 03289398 A | * 12/1991 | ............ H02P/8/00 |
| JP | 06113595 A | * 4/1994 | ............ H02P/8/00 |
| JP | 06-243109 | 9/1994 | |
| JP | 06-309272 | 11/1994 | |
| JP | 07-337095 | 12/1995 | |
| JP | 2000-078889 | 3/2000 | |
| JP | 2001-161095 | 6/2001 | |
| WO | WO 98/13208 | 4/1998 | |

* cited by examiner

*Primary Examiner*—David Martin
*Assistant Examiner*—Eduardo Colon Santana
(74) *Attorney, Agent, or Firm*—Michael T. Gabrik

(57) ABSTRACT

Control data is efficiently serially transferred to a drive device for driving a motor without involving the CPU. Data buffers are allocated at specific memory addresses. An address decoder decodes a memory address output to the address bus and applies a write enable signal to the corresponding data buffer to write data to that data buffer by DMA transfer. When data is written to a data buffer, a sequencer circuit compiles control data, based on data in that data buffers, in a shift register, and serially transfers the control data one bit at a time on a serial transfer line synchronized to a clock.

15 Claims, 10 Drawing Sheets

MOTOR CONTROL APPARATUS AND MOTOR CONTROL METHOD

BACKGROUND OF THE INVENTION

1. Field of the Invention

The present invention relates to a motor control apparatus and method for serially transferring control data to a drive device for driving a motor.

2. Description of the Related Art

Controlling a motor in a device such as a printer is conventionally done by sending control data from a CPU to a motor drive device. Two types of data transmission paths can be used to send the control data: parallel and serial. Serial communication is more cost effective because it requires fewer transmission paths. For that reason, serial communication is widely used.

The control data sent from the CPU to the drive device typically consists of one or more types of data elements. To control a stepping motor, for example, the control data includes phase pattern data indicating the phase pattern of the voltage applied to the motor, and current data indicating the applied current. The drive device for the motor receives control data containing these data elements in a specific format, and drives the motor accordingly. Therefore, to send the control data to the drive device, the CPU must generate control data in a format compatible with the particular drive device based on the phase pattern data, phase current data, and other required data elements, and then serially transfer the control data to the drive device.

This control data has conventionally been generated through an operating process run by the CPU. After writing data to the data buffers that temporarily store the control data elements, the CPU runs the process to generate the control data, and then passes the resulting control data to another circuit for serial transfer. This process must be run every time the data in the data buffers is updated, and this puts a significant processing load on the CPU.

Furthermore, because the control data generating process must be run according to whether data is updated in the data buffer (that is, whether data is written to the data buffer), the CPU must be aware of the data write timing. This means that data cannot be written to the data buffer by direct memory access (DMA), bypassing the CPU. The CPU must therefore also handle writing data to the data buffer, thus further increasing the processing load on the CPU.

OBJECTS OF THE INVENTION

It is an object of the present invention to solve this problem.

It is another object of this invention to provide a motor control apparatus and method for generating control data and serially transferring the control data to a drive device for driving a motor, without adding to the processing load of the CPU.

SUMMARY OF THE INVENTION

To achieve these objects, in accordance with one aspect of the invention, a motor control apparatus is provided, which is capable of serially transferring to a drive device adapted to drive one or more motors control data for controlling the one or more motors. The motor control apparatus comprises at least one data buffer configured to store data; a DMA configured to transfer data to the at least one data buffer by direct memory access; and a processing circuit configured to run a data compiling and transferring process that compiles control data from the data stored in the at least one data buffer and serially transfers the control data to the drive device based on data. In accordance with this aspect of the invention, control data can be compiled and serially transferred, without adding to the processing load of the CPU.

The processing circuit preferably includes a decoder circuit for outputting a write enable signal to a particular data buffer corresponding to a specific memory address, when that specific memory address is supplied to the decoder circuit. The data output to the data bus at the time the write enable signal is output is written to the data buffer. Moreover, each data buffer is preferably configured to transfer data stored therein to the sequencer circuit when that data buffer receives the write enable signal.

Compiling and serially transferring the control data occurs whenever new data is written to the data buffer. Therefore, the data compiling and transferring process is preferably triggered by data being written to the data buffer to thus enable the processing circuit to compile and serially transfer the control data at the appropriate timing. When a respective data buffer is provided for each of a plurality of types of data, as is preferable, the processing circuit starts the data compiling and transferring process when data is written to any one data buffer. Thus, if the control data is compiled from multiple data types, this configuration reliably compiles and serially transfers control data reflecting the most recently written data whenever any one type of data is written to a data buffer.

The data stored in the data buffers and the control data compiled therefrom each comprise a plurality of bits. Preferably, there is a predefined correlation between the positions of the bits of the data in the data buffers and the positions of the bits of the control data, and the processing circuit compiles the control data based on the correlation. The control data can therefore be compiled by simply assigning the value of each bit in the data buffers to the corresponding bit in the control data. The design of the processing circuit can therefore be simplified.

Preferably, the drive device drives a plurality of motors, and one or more data buffers is disposed for each motor. In this case, the drive device is configured to drive a motor indicated by a specific selection signal sent by a selection signal circuit according to the data buffer to which data is written.

Yet further preferably, the motor control apparatus also has a flag setting circuit for setting a transfer reservation flag for a particular data buffer to which data is written when data is written to that data buffer. The processing circuit starts the data compiling and transferring process on data stored in the data buffer for which the transfer reservation flag is set when a present serial transfer of control data is completed. According to this configuration, if data is written to a data buffer during serial transfer of control data, after that data transfer is completed, the processing circuit can then compile and serially transfer additional control data based on the most recently written data.

A prioritizing circuit is provided to accommodate the situation in which there are multiple buffers to which data has been written and for which a transfer reservation flag has been set. The prioritizing circuit sets a priority sequence for such buffers. The processing circuit starts the data compiling and transferring process on data stored in the data buffer having the highest priority specified by the prioritizing circuit. Thus, if data is written to multiple data buffers during a serial transfer of control data, the data buffer to be accessed next after the present data transfer is completed can be specified based on a predefined order of precedence. The specified priority can be set by a priority setting circuit.

Yet further preferably, the processing circuit can operate in a plurality of operating modes using different logic to compile the control data from data stored in the data buffers, and the motor control apparatus additionally has a mode setting circuit for setting the operating mode of the processing circuit.

The motor is preferably a stepping motor, and the control data includes data representing the phase pattern of voltage applied to the stepping motor.

According to another aspect of the invention, a motor control method for serially transferring to a drive device adapted to drive one or more motors control data for controlling the one or more motors is provided. The method is consistent with the function and operation described above with respect to the motor control apparatus.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

Embodiment 1

Figure 1:
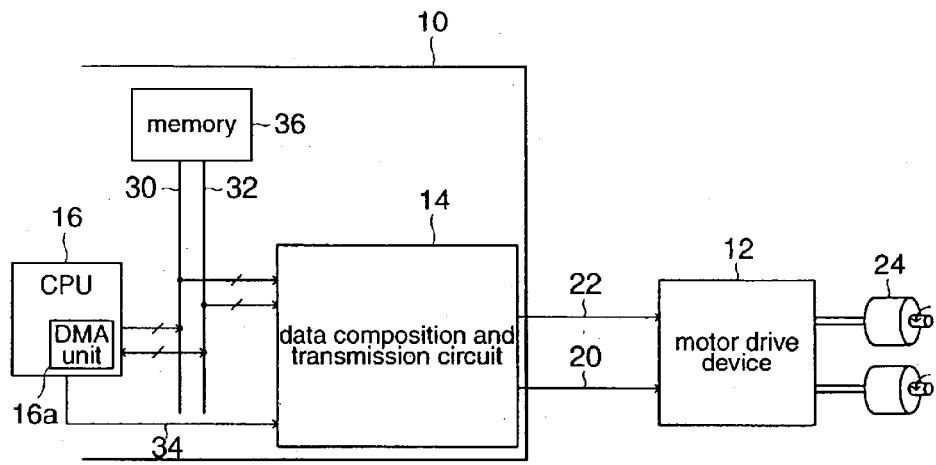
FIG. 1 is a schematic block diagram of a control apparatus and a motor drive device under its control, according to a first embodiment of the present invention.

FIG. 1 shows the configuration of a first embodiment of the present invention. As shown in FIG. 1, a control system according to this embodiment of the invention has a control apparatus 10 and a motor drive device 12. The control apparatus 10 has a data composition and transmission circuit 14 and a CPU 16. The control apparatus 10 can be constructed as a single-chip device using, for example, an ASIC.

The data composition and transmission circuit 14 is connected to the motor drive device 12 through a serial transfer line 20 and synchronization clock line 22. The motor drive device 12 controls one or more stepping motors 24 based on control data serially transferred from the data composition and transmission circuit 14 on the serial transfer line 20.

Inside the control apparatus 10 the data composition and transmission circuit 14 is connected to the address bus 30, data bus 32, and write signal line 34 of the CPU 16. A specified write signal is output to the write signal line 34 when writing to memory 36. A write signal, a write address, and write data are therefore supplied to the data composition and transmission circuit 14 when writing to memory 36. The CPU 16 also has a DMA unit 16a that enables data transfers between memory units without passing through an operating process of the CPU 16.

Figure 2:
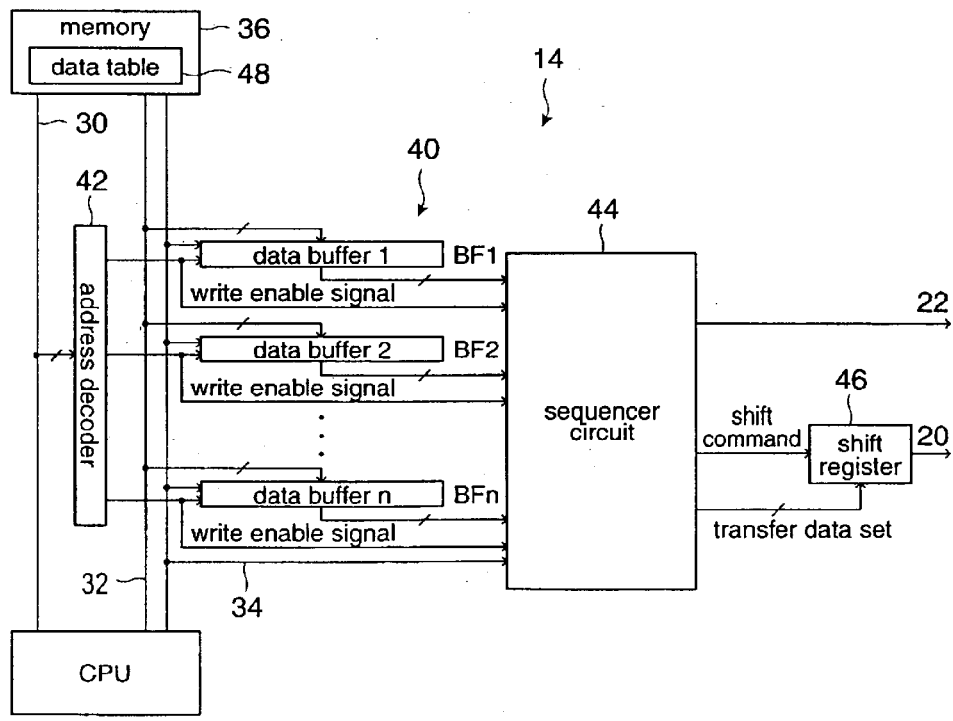
FIG. 2 is a schematic diagram of a portion of the control apparatus, showing details of the data composition and transmission circuit, according to a preferred embodiment of the invention.

FIG. 2 shows the configuration of the data composition and transmission circuit 14 of the control apparatus 10 in detail. As shown in FIG. 2, the data composition and transmission circuit 14 includes a data buffer unit 40, address decoder 42, sequencer circuit 44, and shift register 46. The data buffer unit 40 comprises n data buffers BF1–BFn. The data buffers BF1–BFn store the data from which the control data sent to the motor drive device 12 is generated. The data stored in the data buffers BF1–BFn, sometimes referred to below as "data elements," include different types of data, such as phase pattern data (data representing the voltage pattern to be applied in each phase to the stepping motor 24) and setting data (such as phase current data indicating the current to be supplied to the stepping motor 24 and various settings to be applied to the motor drive device 12).

Figure 3:
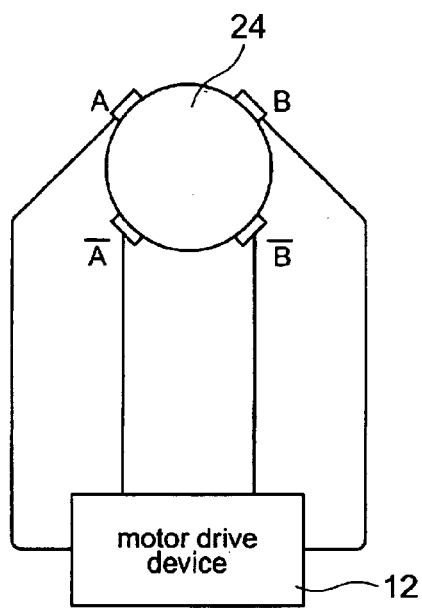
FIG. 3 is a schematic diagram showing a phase arrangement of a typical stepping motor.

The phase pattern of the stepping motor 24 is described next. FIG. 3 shows the phase arrangement of a typical stepping motor 24, and FIG. 4 shows an example of the voltage waveform applied in each phase to the stepping motor 24.

Figure 4:
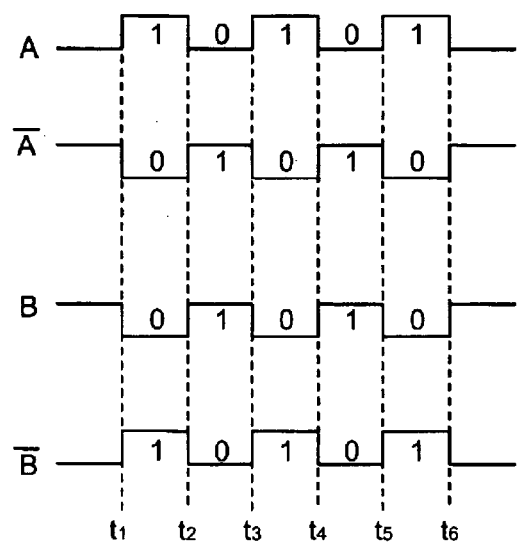
FIG. 4 shows examples of voltage waveforms applied in each phase of the stepping motor.

As shown in FIG. 3 the stepping motor 24 has, for example, four phases and is driven by changing the voltage applied in each of these phases as shown in FIG. 4. The phase pattern data denotes the voltage pattern (i.e., 1 (HIGH) or 0 (LOW) to be applied in each phase to the stepping motor 24. As shown in FIG. 4, for example, at time t1 phase pattern data [1,0,0,1] is applied; at time t2 [0,1,1,0] is applied; at time t3 [1,0,0,1] is applied, etc.

It should be noted that the torque produced by the stepping motor 24 depends on the current applied in each phase (the phase current), and the phase current data indicates the applied phase current. That is, the current supplied to the stepping motor 24 is controlled by the phase current data to achieve a specific torque according to the acceleration/deceleration pattern of the stepping motor 24.

The CPU 16 produces data elements such as the phase pattern data and setting data as noted above according to the driving pattern of the element to be controlled, e.g., stepping motor 24, and stores the data elements in a data table 48 provided at a specific address area in memory 36. The data elements stored in this data table 48 are transferred by DMA to the appropriate data buffers BF1–BFn by the DMA unit 16a. More specifically, a specific memory address is allocated in the data table for each data buffer BF1–BFn, and as further described below, when data transferred by DMA to any of these memory addresses, that data is written in the corresponding data buffers BF1–BFn.

As shown in FIG. 2, the address decoder 42 is connected to the address bus 30 of CPU 16. Each data buffer BF1–BFn is connected to the data bus 32 and write signal line 34 of CPU 16. As noted above, each data buffer BF1–BFn is allocated to a specific memory address, and the address decoder 42 decodes the write address output on the address bus 30 and outputs a write enable signal to the data buffer BF1–BFn corresponding to the decoded address. The data output to data bus 32 is written to a corresponding data buffer BF1–BFn when a write enable signal is output from the address decoder 42 to that data buffer, and a write signal is also output to the write signal line 34. Therefore, when data is sent by DMA to one or more of the data buffers BF1–BFn corresponding to the assigned memory address (es), the data is stored to the specified data buffer(s).

The write enable signal 34 applied to the data buffers BF1–BFn is also supplied to the sequencer circuit 44. Triggered by the write enable signal 34 output to any data buffer, the sequencer circuit 44 compiles the control data for controlling the stepping motor 24 from the data elements stored in the data buffers BF1–BFn, and writes the control data to the shift register 46. More specifically, the data elements are compiled such that a specific correlation exists according to the specification of the motor drive device 12 between each bit position in the data elements and each bit position in the control data, and the sequencer circuit 44 outputs each bit value of the data elements to the corresponding bit position in the shift register 46.

After writing the control data to the shift register 46, the control data is sent bit-by-bit to the motor drive device 12 by outputting a shift command to the shift register 46 synchronized to the clock signal.

Figure 5:
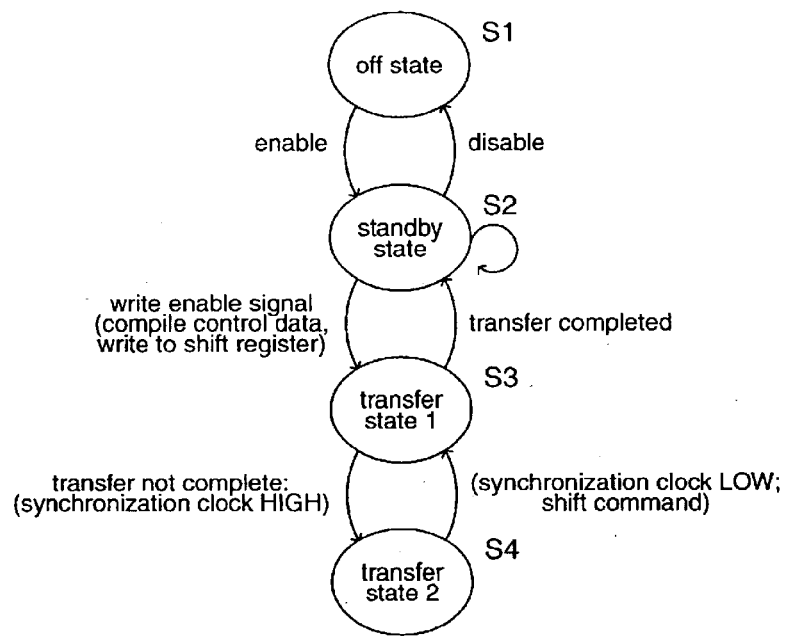
FIG. 5 is a state transition diagram describing operation of the sequencer circuit, according to a preferred embodiment of the invention.

FIG. 5 is a state transition diagram showing the operation of the sequencer circuit 44. The sequencer circuit 44 can be functionally enabled and disabled by external input. When functionally enabled while in the off state S1, it shifts to the standby state S2. If functionally disabled while in this standby state S2, it returns to the off state S1.

If output of a write enable signal to any data buffer BF1–Fn is detected in the standby state S2, the control data is written to the shift register 46 based on the value of each data element stored in the data buffers BF1–BFn, and circuit goes to a first transfer state S3.

The synchronization clock is set HIGH in the first transfer state S3 if the transfer is not complete, and circuit 44 goes to a second transfer state S4. In the second transfer state S4 the synchronization clock is set LOW and a shift command is sent to the shift register 46. This causes 1 bit of control data set in the shift register 46 to be sent on the serial transfer line 20 synchronized to the transition of the synchronization clock signal, asserted on the synchronization clock line 22, to LOW. The first transfer state S3 is resumed when this process ends. If data transfer of all bits from the shift register is completed, standby state S2 is resumed, but if data transfer is not completed the synchronization clock is set LOW and circuit 44 goes to the second transfer state S4.

When a write enable signal is supplied to any of the data buffers BF1–BFn (that is, when new data elements are stored in any of the data buffers BF1–BFn), the sequencer circuit 44 is thereby triggered to compile control data and serially send the data to the motor drive device 12. Because the CPU 16 is therefore not required to compile or serially transfer the control data, data can be stored by DMA to the data buffers BF1–BFn while at the same time composing and serially transferring control data based on new data elements.

In other words, because it is necessary to detect when control data generation is necessary (i.e., when data was written to any of the data buffers BF1–BFn) and run the control data generation process at that time if the control data generation and transfer process is handled by the CPU 16, data cannot be stored to data buffers BF1–BF4 by DMA bypassing the CPU 16.

With this embodiment of the present invention, a sequencer circuit 44 compiles the control data triggered by data being written to data buffers BF1–BFn. The CPU 16 therefore does not need to detect the data write timing to the data buffers BF1–BFn, and data can therefore be written by DMA to the data buffers BF1–BFn while composing and serially transferring the control data based on supplied data elements.

A second embodiment of the present invention is described next below. It should be noted that in this second embodiment, as well as in additional embodiments described below, like parts are therefore identified by like reference numerals, and further description thereof is either omitted or simplified.

This second embodiment of the invention has two data buffers BF1 and BF2. Data representing the control data itself is stored as the data elements in data buffer BF1, and phase pattern data is stored as the data elements in data buffer BF2.

Figure 6:
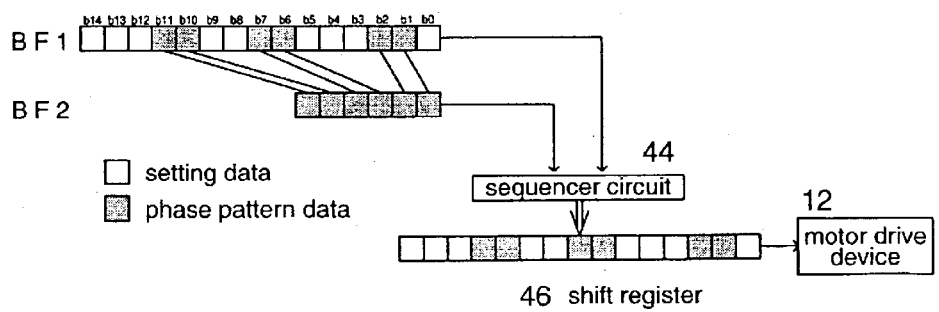
FIG. 6 shows the relationship between data stored in the data buffer, and control data compiled by the sequencer circuit from data in the data buffer and stored in the shift register, according to a second embodiment of the invention.

FIG. 6 shows the relationship between data elements stored in data buffers BF1 and BF2 in the present embodiment, and the control data compiled and stored in the shift register 46 by the sequencer circuit 44 based on these data elements. As shown in the figure, the bits representing the phase pattern data and the bits representing the setting data (set value) are written to specific bit positions according to the control data format. In the example shown in FIG. 6, bits b1, b2, b6, b7, b10, b11 represent the phase pattern data, the other bits b0, b3, b4, b5, b8, b9, b12, b13, b14 represent the setting data, and control data is stored in data buffer BF1 in this format. The control data is thus formatted with the bits denoting the set values distributed amongst the bits representing the phase pattern data. Of the data stored in data buffer BF1, the bits representing the phase pattern, that is, the phase pattern data, are stored in data buffer BF2.

Therefore, when data is written to data buffer BF1, the sequencer circuit 44 outputs that data as the control data to the shift register 46. However, when phase pattern data is written to data buffer BF2, the bit values of the phase pattern data are overwritten to the corresponding bits b1, b2, b6, b7, b10, b11 in the sequencer circuit 44, and the values of other bits corresponding to the settings are held without being changed.

This embodiment of the invention thus has a data buffer BF1 for storing the data corresponding to the control data itself and a data buffer BF2 for storing only the phase pattern data, and when new phase pattern data is written to data buffer BF2 the sequencer circuit 44 updates the bits corresponding to the phase pattern data of the control data and serially transfers the new control data.

As in the first embodiment described above control data can be compiled and serially transferred while writing data by DMA to data buffer BF1 and data buffer BF2.

Furthermore, as described in the first embodiment, a data table 48 for transferring the data elements to data buffer BF1 and data buffer BF2 is reserved in memory 36. While the phase pattern data must be changed at short intervals in conjunction with stepping motor 24 operation, the setting data is changed much less frequently.

The present embodiment exploits this difference in change frequency to make more efficient use of available memory. Accordingly, it is sufficient to reserve a small data table (for storing only 6 bits in this embodiment) that is just large enough to store the number of bits in data buffer BF2, i.e., the frequently changing phase pattern data, and to store only the data that changes when the value changes in a larger data table (15 bits in this embodiment) sized for data buffer BF1. As a result, the amount of memory required for the data table 48 can be greatly reduced.

Furthermore, because the control data can be compiled by the sequencer circuit 44 outputting the bits from data buffer BF1 and data buffer BF2 to the corresponding bit positions in the shift register 46, the sequencer circuit 44 can be simplified and the cost of the control apparatus 10 can therefore be reduced. When the phase pattern data bits are dispersed in the control data as in the present embodiment, for example, the sequencer circuit 44 can be simplified by simply using appropriate logic circuits corresponding to these bit positions.

A third embodiment of the present invention is described next. In this embodiment two stepping motors 24A and 24B are driven by the motor drive device 12, and three data buffers BF1 to BF3 are used.

Figure 7:
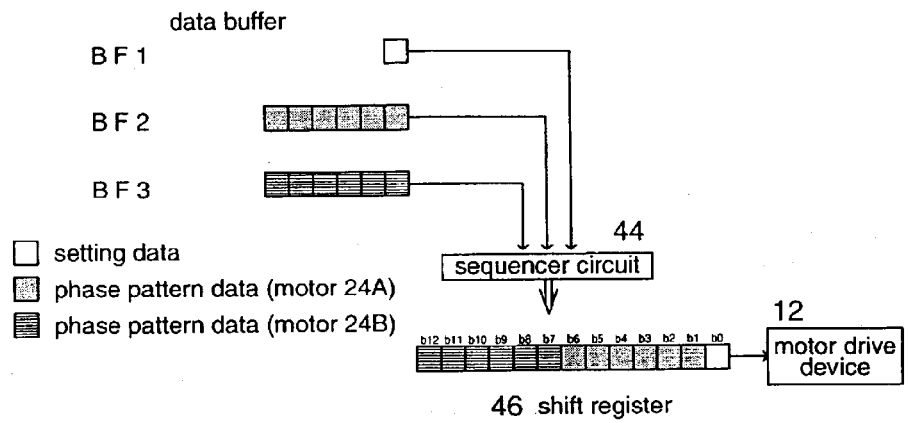
FIG. 7 shows the relationship between data stored in the data buffer, and control data compiled by the sequencer circuit from data in the data buffer and stored in the shift register, according to a third embodiment of the invention.

FIG. 7 shows the relationship between data elements stored in data buffers BF1 to BF3 in this embodiment and the control data compiled and stored in the shift register 46 by the sequencer circuit 44 based on the data elements stored in the data buffers. As shown in the figure, setting data common to stepping motors 24A and 24B is stored in data buffer BF1, and phase pattern data for stepping motor 24A and stepping motor 24B are respectively stored in data buffers BF2 and BF3. When data is written to any of data buffers BF1 to BF3, the sequencer circuit 44 produces the control data by outputting each bit in data buffers BF1 to BF3 to the corresponding bit in shift register 46. In the example shown in FIG. 7 the setting data from data buffer BF1 is output to bit b0 of the shift register, the phase pattern data from data buffer BF2 is output to bits b1 to b6, and the phase pattern data from data buffer BF3 is output to bits b7 to b12.

Control data transferred to the motor drive device 12 in the present embodiment contains phase pattern data for both stepping motors 24A and 24B.

As a result, when the phase pattern data changes for either stepping motor 24A or stepping motor 24B, it is necessary to produce control data based on the data elements from the three data buffers BF1 to BF3, including the other stepping motor for which the data has not changed.

When data is written to any data buffer BF1 to BF3 in the present embodiment, the sequencer circuit 44 therefore compiles and serially transfers control data based on the data stored to the three data buffers BF1 to BF3. To control two stepping motors 24A and 24B, the CPU 16 therefore simply writes phase pattern data to a data table for each time the phase pattern changes for each stepping motor 24A and 24B. Thereafter, the data is transferred to the appropriate data buffers by DMA from the data tables, and the sequencer circuit 44 produces and serially transfers the control data to the motor drive device 12 from the data in the data buffers. The CPU 16 can therefore simply generate the phase pattern data by running separate processes for each motor without considering the relationship between the stepping motors 24A and 24B, thereby simplifying the process run by the CPU 16.

This embodiment of the invention can therefore appropriately produce and serially transfer control data to a motor drive device 12 for driving multiple stepping motors 24A and 24B based on common control data without burdening the CPU 16.

Figure 8:
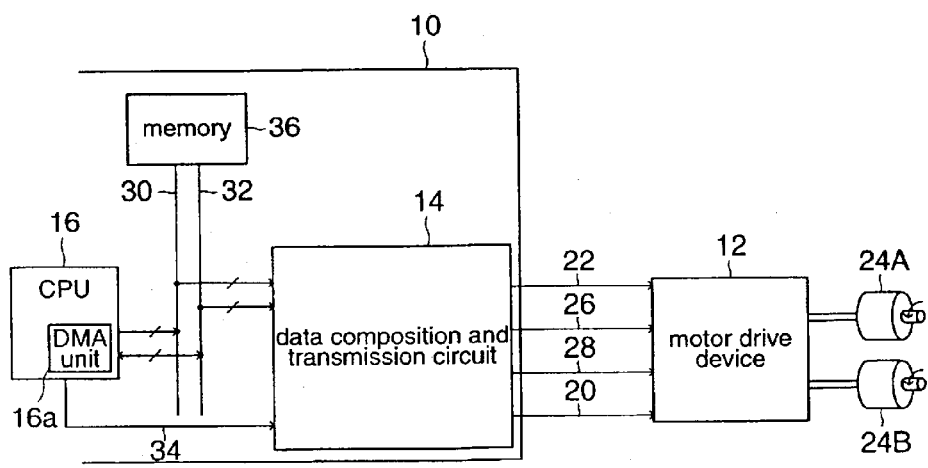
FIG. 8 a schematic diagram of a portion of the control apparatus, showing details of the data composition and transmission circuit, according to a third embodiment of the invention.

A fourth embodiment of the present invention is described next with reference to FIG. 8, which is a schematic diagram showing the configuration of the present embodiment.

As shown in the figure two stepping motors 24A and 24B are driven by a common motor drive device 12 as in the third embodiment. However, the present embodiment differs from the third by disposing first and second selection lines 26 and 28, in addition to the serial transfer line 20 and synchronization clock line 22, between the control apparatus 10 and motor drive device 12.

These two selection lines 26 and 28 are used to specify whether the control data transferred over the serial transfer line 20 is for stepping motor 24A or stepping motor 24B. That is, if the first selection line 26 is ACTIVE, the motor drive device 12 drives stepping motor 24A based on the control data received over the serial transfer line 20, but if the second selection line 28 is ACTIVE, it drives stepping motor 24B based on the control data sent over the serial transfer line 20.

Figure 9:
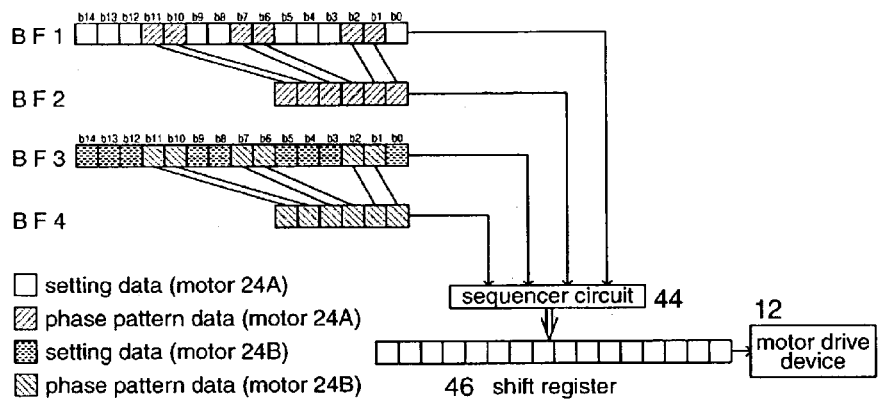
FIG. 9 shows the relationship between data stored in the data buffer, and control data compiled by the sequencer circuit from data in the data buffer and stored in the shift register, according to a fourth embodiment of the invention.

FIG. 9 shows the relationship between the data elements stored in each data buffer in this embodiment and the control data produced and stored in the shift register 46 by the sequencer circuit 44 based on the buffered data. As shown in the figure, this embodiment of the invention has four data buffers BF1 to BF4. Data formatted identically to the control data is stored in data buffer BF1 and the phase pattern data is stored in data buffer BF2, for stepping motor 24A. Likewise, data formatted identically to the control data is stored in data buffer BF3 and the phase pattern data is stored to data buffer BF4, for stepping motor 24B.

Figure 10:
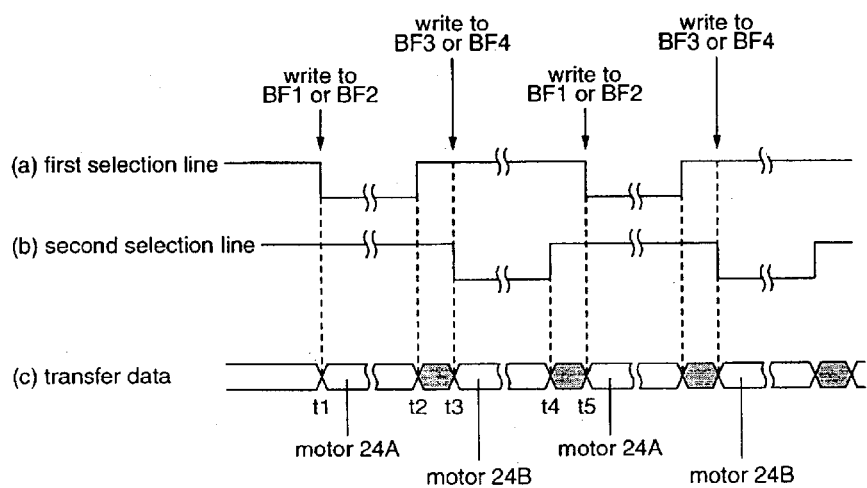
FIG. 10 is a timing chart showing the operation of the sequencer circuit, according to the fourth embodiment.

FIG. 10 is a timing chart showing the operation of the sequencer circuit 44 in the present embodiment. FIG. 10(a) shows signals on the first selection line 26, 10(b) shows signals on the second selection line 28, and 10(c) shows the data transferred over serial transfer line 20.

Referring to FIG. 10, when data is written to data buffer BF1 or BF2 for stepping motor 24A at time t1, the sequencer circuit 44 sets first selection line 26 ACTIVE (LOW in this embodiment). If data was written to data buffer BF1, the data is output directly to the shift register 46. If data is written to data buffer BF2, the sequencer circuit 44 overwrites each bit of the buffered data to the corresponding bits in the shift register 46 (i.e., bits b1, b2, b6, b7, b10, b11). The data written to the shift register 46 is then serially transferred to the motor drive device 12 as the control data for stepping motor 24A. When all control data bits have been serially transferred at time t2, the sequencer circuit 44 sets the first selection line 26 INACTIVE (HIGH in this embodiment).

Control data for stepping motor 24A is thus sent from the serial transfer line 20 when data is written to either of the data buffers BF1 and BF2 for stepping motor 24A. It should be noted that the motor drive device 12 drives stepping motor 24A based on the serially transferred control data because the first selection line 26 is ACTIVE.

Furthermore, when data is written to either data buffer BF3 or BF4 for stepping motor 24B at time t3, the sequencer circuit 44 sets the second selection line 28 ACTIVE and compiles and serially transfers control data to the motor drive device 12 based on the data written to data buffer BF3 and BF4 as described above. When all control data bits have been transferred at time t4, the second selection line 28 is set INACTIVE. Because the second selection line 28 is ACTIVE while data is being transferred, the motor drive device 12 drives stepping motor 24B based on the received control data.

As described above, the sequencer circuit 44 in the present embodiment serially transfers control data to the motor drive device 12 according to whether data for stepping motor 24A or stepping motor 24B has changed (that is, whether data was written to data buffers BF1 or BF2, or to data buffers BF2 or BF4), and sets either first selection line 26 or second selection line 28 ACTIVE according to whether stepping motor 24A or 24B is to be driven.

The CPU 16 therefore only needs to prepare phase pattern data and setting data for each motor in corresponding data tables, and this data can thereafter be moved by DMA from the data tables to the appropriate data buffers BF1 to BF4 without involving the CPU 16. The sequencer circuit 44 then compiles and serially transfers control data to the motor drive device 12, and appropriately controls the selection lines 26 and 28. By thus configuring the motor drive device 12 so that the motor to be driven can be indicated via selection lines 26 and 28, control data can be produced and serially transferred, and selection lines 26 and 28 can be controlled, without involving the CPU 16.

A fifth embodiment of the invention is described next. This embodiment of the invention can serially transfer control data without data transfer leaks even when data is written to one of the data buffers during serial transfer of control data.

As in the fourth embodiment, the present embodiment uses data buffers BF1 and BF2 for stepping motor 24A, and data buffers BF3 and BF4 for stepping motor 24B, and indicates which motor the transferred control data is for by means of a first selection line 26 and second selection line 28.

Figure 11:
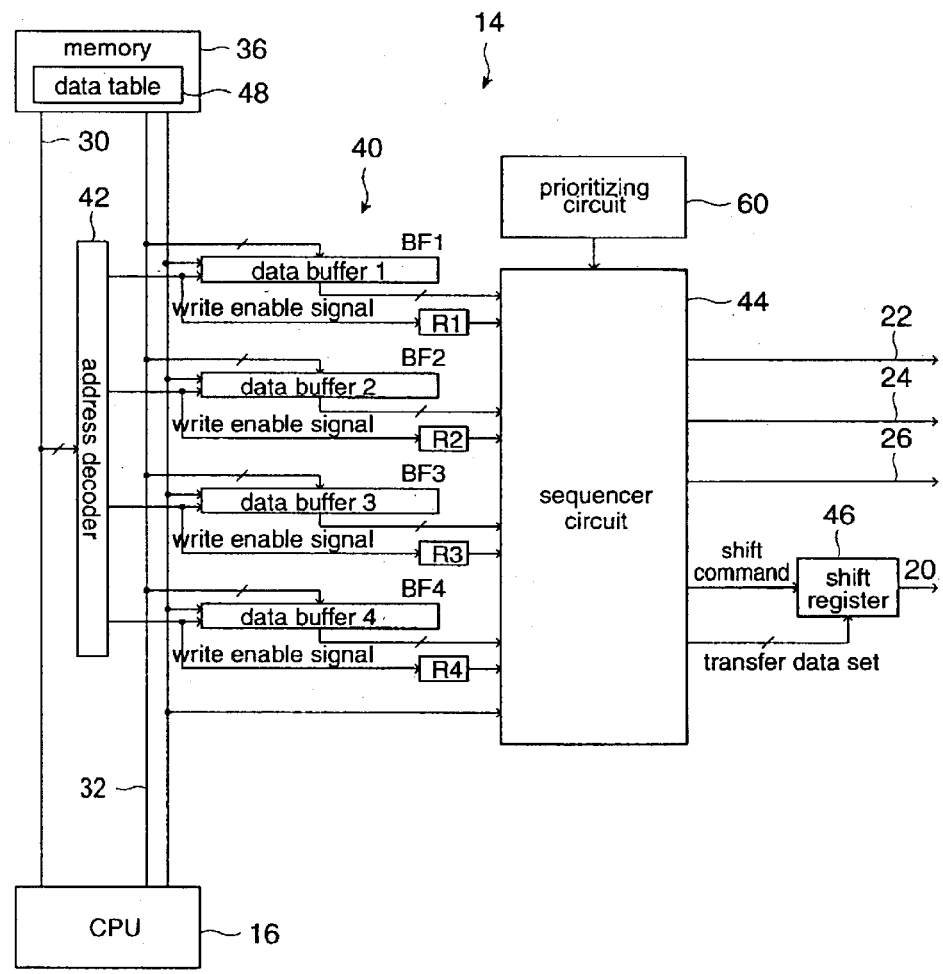
FIG. 11 is a schematic diagram of a portion of the control apparatus, showing details of the data composition and transmission circuit, according to a fifth embodiment of the present invention.

FIG. 11 shows the configuration of the control apparatus 10 in the present embodiment. As shown in the figure, this embodiment also has transfer reservation hold circuits R1–R4 corresponding to data buffers BF1 to BF4, and a prioritizing circuit 60.

The transfer reservation hold circuits R1–R4 hold a transfer reservation flag for indicating whether control data based on data stored in data buffers BF1 to BF4 should be serially transferred. For example, if data is written to data buffer BF3, while control data for stepping motor 24A based on data written to data buffer BF1 is being serially transferred, control data for stepping motor 24B based on the data being written to data buffer BF3 cannot be immediately serially transferred. The transfer reservation flag is therefore set in transfer reservation hold circuit R3. Then, when serial transfer of the control data for stepping motor 24A is completed, control data is compiled and serially transferred for stepping motor 24B corresponding to the data held in data buffer BF3 for which the transfer reservation flag was set.

Furthermore, the prioritizing circuit 60 holds the order of precedence in which control data is compiled and serially transferred from the data buffers when data is written to multiple data buffers. For example, if data is written to data buffer BF2 and data buffer BF3 during serial transfer of control data for stepping motor 24A, and data buffer BF3 is set to a higher priority than data buffer BF2, control data will be compiled and serially transferred first for stepping motor 24B corresponding to the higher priority data buffer BF3 when serial transfer of control data for stepping motor 24A is completed.

Figure 12:
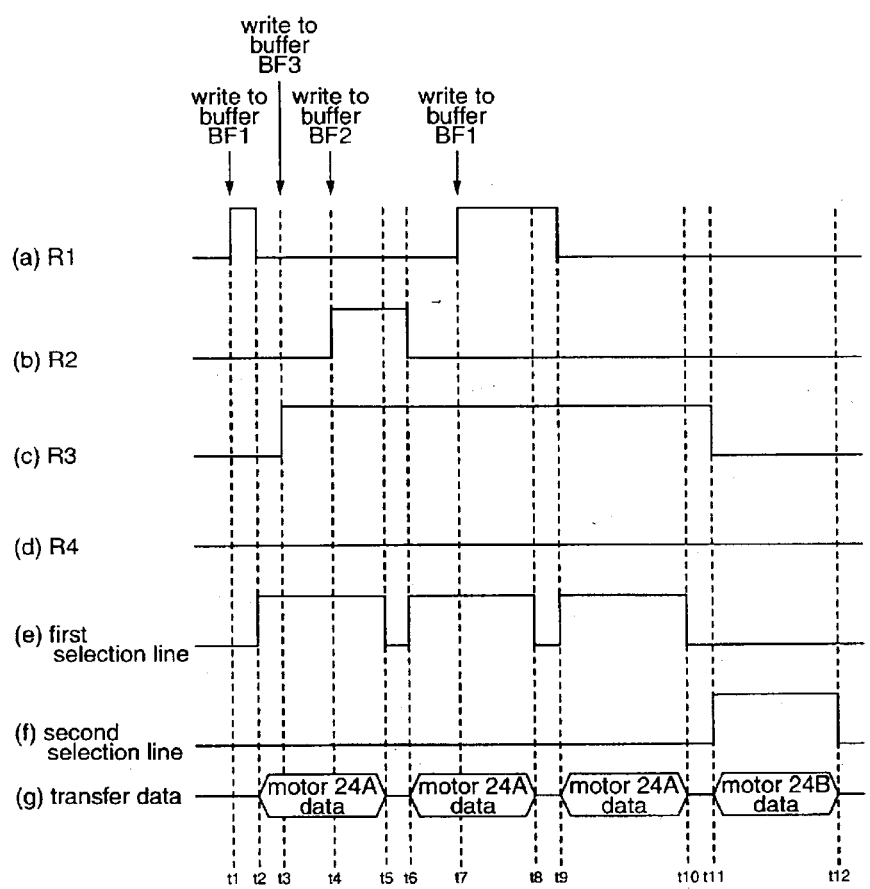
FIG. 12 is a timing chart showing the operation of the sequencer circuit according to the fifth embodiment.

FIG. 12 is a timing chart showing the operation of the sequencer circuit 44 in the present embodiment. FIG. 12(*a*) to 12(*d*) show the change in the transfer reservation flag set in transfer reservation hold circuits R1–R4 when data is written to data buffers BF1 to BF4, 12(*e*) and 12(*f*) show the signals output to the first selection lines 26 and 28 respectively, and 12(*g*) shows the content of the serially transferred control data. Data buffers BF1, BF2, BF3, BF4 are set in this order from high (BF1) to low (BF4) priority in the prioritizing circuit 60.

In the example shown in the figure, data is written to data buffer BF1 and the transfer reservation flag is set in transfer reservation hold circuit R1 at time t1. The highest priority is set to data buffer BF1, and because no data is being transferred at this time the sequencer circuit 44 sets the first selection line 26 ACTIVE at time t2. The transfer reservation flag in transfer reservation hold circuit R1 is also reset and serial transfer of control data for stepping motor 24A compiled from the data stored to data buffer BF1 starts. When this serial transfer ends, the first selection line 26 is set to INACTIVE at time t5.

During the above serial transfer of control data, data is written to data buffer BF3 at time t3. Thus, the transfer reservation flag is set in transfer reservation hold circuit R3 at that time. Data is also written to data buffer BF2 at time t4, at which time the transfer reservation flag is also set in transfer reservation hold circuit R2. Therefore, when the serial data transfer in progress ends and the first selection line 26 goes INACTIVE (at time t5), the transfer reservation flag is set in both transfer reservation hold circuits R2 and R3. Because data buffer BF2 is set to a higher priority than data buffer BF3, the sequencer circuit 44 processes data buffer BF2 first. That is, the transfer reservation flag for transfer reservation hold circuit R2 is reset, first selection line 26 is again set ACTIVE, and control data for stepping motor 24A is compiled and serially transferred based on the data stored in data buffer BF2 (time t6).

During this serial transfer, data is again written to data buffer BF1 and the transfer reservation flag in R1 is set (time t7). The present serial transfer (based on the data written to BF2) ends at time t8, at which time first selection line 26 goes INACTIVE. At that time, the transfer reservation flag is still set in each of R1 and R3. Because data buffer BF1 has a higher priority than data buffer BF3, the first selection line 26 is again set ACTIVE, control data compiled from the data in BF1 for stepping motor 24A is again serially transferred (starting at time t9). The transfer reservation flag in R1 is also reset at t9.

Because no new data is written to the data buffers before this serial transfer ends, only the transfer reservation flag in transfer reservation hold circuit R3 is set when the present serial transfer ends and the first selection line 26 goes INACTIVE (at time t10). The sequencer circuit 44 therefore starts to serially transfer control data compiled for stepping motor 24B based on the data in data buffer BF3 at time t11, at which time the second selection line 28 is set ACTIVE. This transfer ends at time t12.

Figure 13:
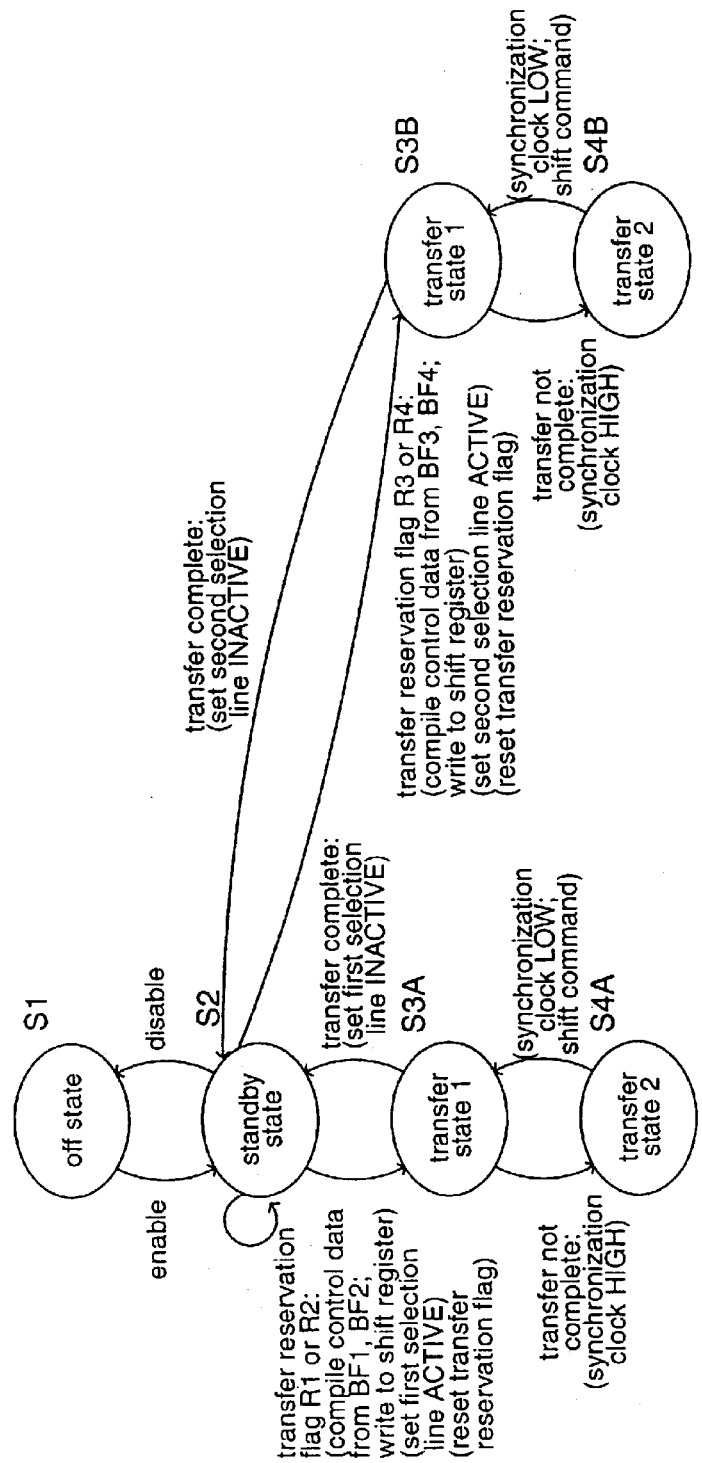
FIG. 13 is a state transition diagram showing the operation of the sequencer circuit according to the fifth embodiment.

FIG. 13 is a state transition diagram describing the operation of the sequencer circuit 44 in the present embodiment. It should be noted that further description of those parts duplicating the state transition diagram shown in FIG. 5 for the sequencer circuit 44 is omitted below.

If the transfer reservation flag is set for any of the transfer reservation hold circuits R1–R4 in the standby state S2, control data is written to the shift register 46 based on priority. Any data stored in data buffers BF1 and BF2 have priority, if the flag is set in either of the highest priority transfer reservation hold circuits R1 or R2. In that case, the first selection line 26 is set ACTIVE, and the transfer reservation flag is reset.

Circuit 44 then goes to first transfer state S3A. If the transfer is completed, the first selection line 26 goes INACTIVE, and the circuit 44 returns to the standby state S2.

If the transfer reservation hold circuit with the highest priority in which the transfer reservation flag is set is R3 or R4, the second selection line 28 is set ACTIVE, and the flag is reset, and control moves to first transfer state S3B, in which control data is written to the shift register 46 based on the data stored to data buffer BF3 or BF4.

In each of the first transfer states S3A and S3B, if the synchronization clock is set HIGH indicating that the transfer is not complete, the circuit 44 moves to a corresponding second transfer state S4A or S4B. The synchronization clock is then set LOW in second transfer state S4A/S4B, and a shift command is applied to the shift register 46. Synchronized to the synchronization clock of the synchronization clock line 22 going LOW, the control data in shift register 46 is sent one bit at a time to the serial transfer line 20. If all bits have been transferred from the shift register, the corresponding selection line 26 or 28 is set INACTIVE and the circuit 44 returns to the standby state S2. If data transfer is not completed, the synchronization clock is again set LOW in second transfer state S4A or S4B, and transfer is again attempted.

It will thus be apparent that if data is written to any of data buffers BF1 to BF4 during the serial transfer of control data, a transfer reservation flag is set in a corresponding transfer reservation hold circuit R1–R4, and after the present serial transfer ends, control data for the data buffer for which the transfer reservation flag is set is automatically serially transferred. As a result, if data is written to any of data buffers BF1 to BF4 during serial data transfer, control data determined by the written data can be reliably transferred.

Furthermore, by prioritizing the data buffers BF1 to BF4, control data is transferred with precedence given to the data buffer with the highest priority when data is written to multiple data buffers while data transfer is in progress. This means that if, for example, there is a difference in the importance of the stepping motors 24A and 24B and one should be controlled with precedence over the other, control commensurate with the importance of the stepping motors 24A and 24B can be applied by setting the order in which the data buffers BF1 to BF4 should be processed in the prioritizing circuit 60 according to this preferred precedence. Selection of the data buffers BF1 to BF4 based on this defined priority can then be handled by the sequencer circuit 44. Motor control determined by a defined priority can therefore be applied by the present embodiment without applying any processing load on the CPU 16.

It should be noted that this embodiment has been described in connection with producing and serially transferring control data for stepping motor 24A based on data in data buffers BF1 and BF2 and control data for stepping motor 24B based on data in data buffers BF3 and BF4. The invention shall not be so limited, however. Other arrangements are possible, in terms of which motor corresponds to which buffer(s) and in terms of buffer priority, as will be appreciated by those skilled in the art. This embodiment illustrates one way in which four types of control data based on data stored in four different data buffers can be compiled and serially transferred, based on a particular buffer priority scheme, to achieve appropriate control when plural transfer reservation flags are set.

Referring to the timing chart in FIG. 12, for example, control data based on data from data buffer BF1 is transferred from time t2 to t5, control data based on data in data buffer BF2 is transferred from time t6 to t8, control data based on data in data buffer BF1 is transferred from time t9 to t10, and control data based on data in data buffer BF3 is transferred from time t11 to t12. This set forth an example in prioritizing the buffers. As will be appreciated by those skilled in the art many other variations are possible.

It should be further noted that the preceding embodiment could also be configured so that the priority of the data buffers BF1 to BF4 held in transfer reservation hold circuits R1 to R4 can be set from the CPU 16. This configuration provides greater flexibility and adaptability to system changes because the priority sequence can be set as needed when the system configuration is changed.

Figure 14:
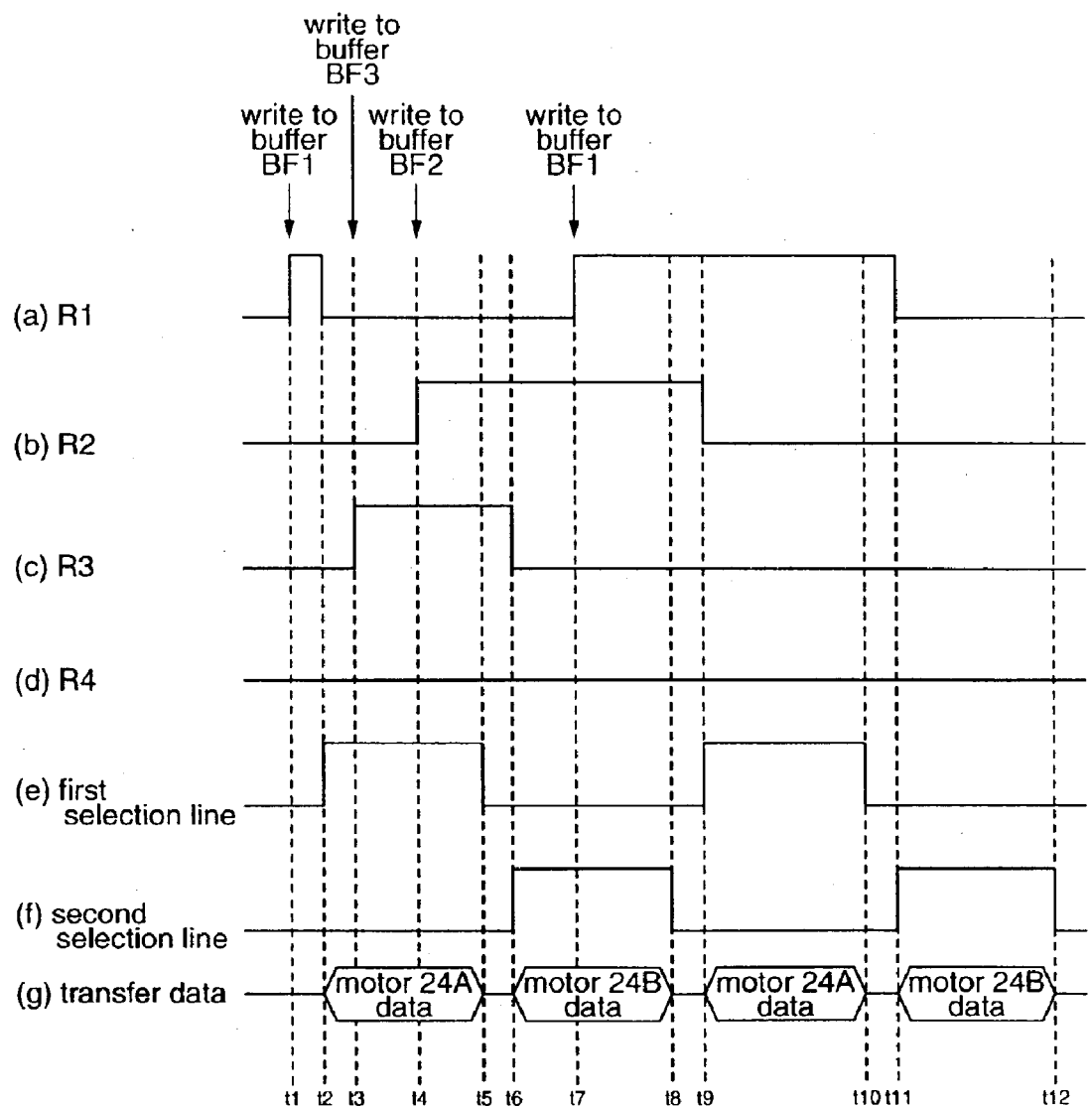
FIG. 14 is a timing chart for a case where the priority of the data buffers is changed as compared with the priority shown in FIG. 12.

FIG. 14 is a timing chart describing operation when the priority sequence of the data buffers is changed from BF1 to BF4 as described above to BF4 (highest priority), BF3, BF2, and BF1 (lowest priority). Data is written to the data buffers at the same times shown in FIG. 12.

When serial transfer of control data triggered by writing data to data buffer BF1 is completed at time t5, the transfer reservation flag remains set in both transfer reservation hold circuits R2 and R3. Because data buffer BF3 has higher priority than BF2 in this example, the transfer reservation flag in R3 is reset and the second selection line 28 is set ACTIVE at time t6, and control data for stepping motor 24B based on data buffer BF3 is serially transferred. When this serial transfer ends (time t8), the transfer reservation flag remains set in both transfer reservation hold circuits R1 and R2. Because data buffer BF2 has higher priority than data buffer BF1 in this example, the transfer reservation flag in R2 is reset and the first selection line 26 is set ACTIVE at time t9, and serial transfer of control data for stepping motor 24A corresponding to the data written to data buffer BF2 begins. After this data transfer ends, the transfer reservation flag in R1 is reset and the second selection line 28 is set ACTIVE at time t11, and transfer of control data for stepping motor 24A corresponding to the data written to data buffer BF1 begins.

A sixth embodiment of the present invention is described next. In this embodiment the sequencer circuit 44 operates in two modes, i.e., first and second operating modes.

Figure 15:
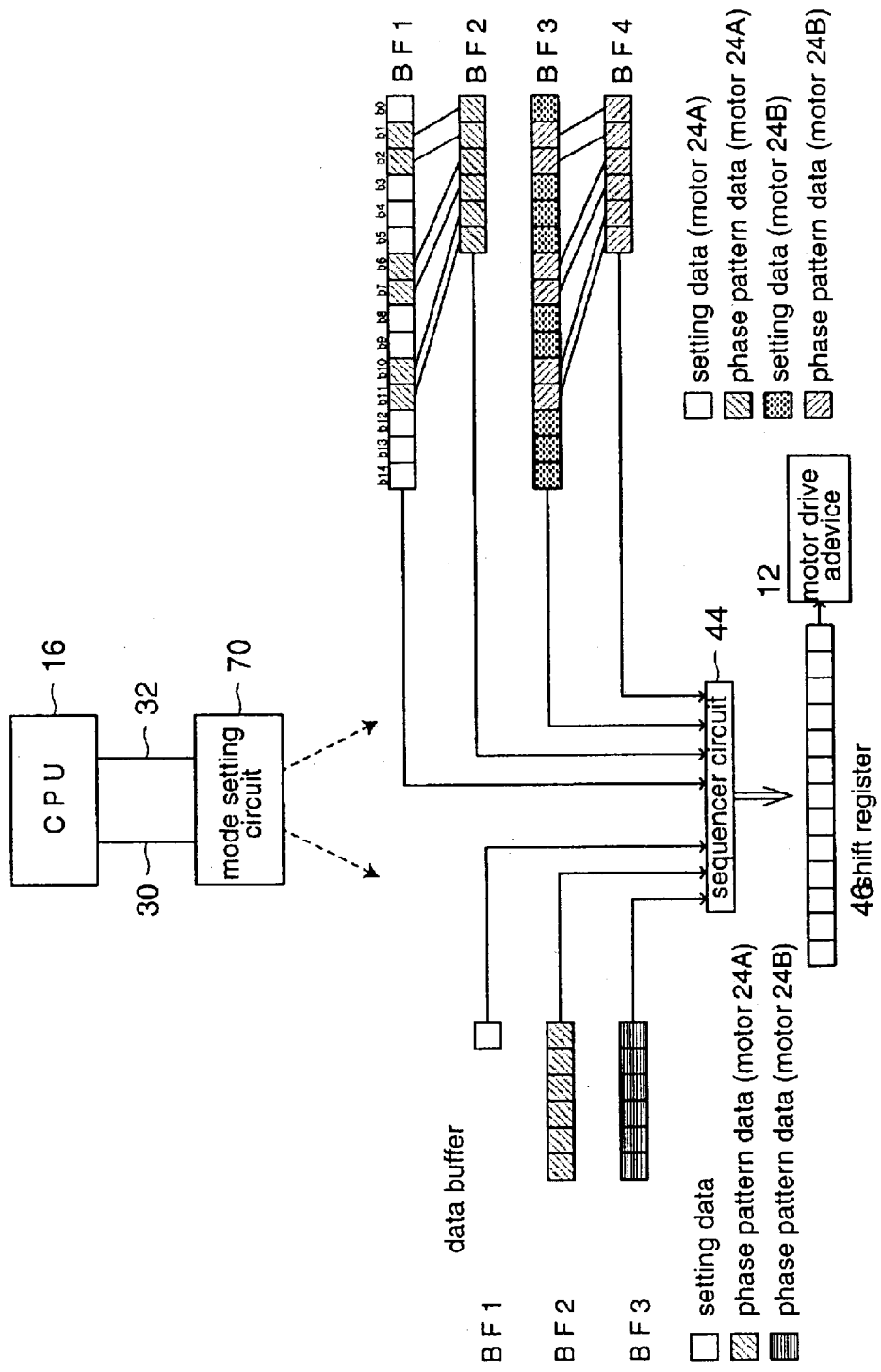
FIG. 15 shows the relationship between data stored in data buffers BF1–BF4, and control data compiled by the sequencer circuit based on this data and stored in the shift register, according to a sixth embodiment of the invention.

FIG. 15 shows the relationship between data stored in data buffers BF1 to BF4 in the present embodiment and control data compiled and written to the shift register 46 by the sequencer circuit 44 based on the buffered data. As shown in the figure the sequencer circuit 44 in this embodiment has a mode setting circuit 70, and operates in a first or second mode according to the operating mode setting of the mode setting circuit 70.

In the first operating mode, setting data is stored to data buffer BF1 as in the third embodiment (FIG. 7), for example, and phase pattern data for stepping motors 24A and 24B is stored in data buffer BF2 and data buffer BF3. The control data is generated based on the data in data buffers BF1 to BF3.

In the second mode data formatted identically to the control data is stored to data buffer BF1 and phase pattern data is stored to data buffer BF2 for stepping motor 24A, and data formatted identically to the control data is stored to data buffer BF3 and phase pattern data is stored to data buffer BF4 for stepping motor 24B, as in the fourth embodiment (FIG. 9) described above. The control data is then produced based on the data from data buffers BF1 to BF4.

The mode setting circuit 70 is connected to address bus 30 and data bus 32 of CPU 16, and the operating mode setting of the mode setting circuit 70 is controlled by the CPU 16.

This embodiment is therefore compatible with two types of motor drive devices 12 using different control data configurations. This embodiment of the invention can therefore flexibly adapt to changes in the type of motor drive device 12 due to a system design change by means of the CPU 16 changing the operating mode setting.

As the foregoing demonstrates, the present invention can generate and serially transfer control data to be transmitted to a drive device for driving a motor without applying any processing load on the CPU. The embodiments of the present invention have been described in the context of controlling one or two stepping motors. However, this invention is not so limited. Rather, the teachings of the invention can be applied to control one, two or more of other types of motors as well, such as DC motors.

That is, the present invention can be used in applications in which a DC motor is driven by a drive device, and the DC motor is controlled by serially transferring control data in a specific format to the drive device. In such application, the present invention can generate and serially transfer control data for control of the DC motor without putting any processing load on the CPU.

The format of the data elements and control data generated from the data elements is described specifically in the second to sixth embodiments above, but it will be apparent that this such description is by way of example only and that other data formats can be used according to the specifications of the motor drive device 12.

While the invention has been described in connection with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A motor control apparatus for serially transferring to a drive device adapted to drive one or more motors control data for controlling the one or more motors, the apparatus comprising:

at least one data buffer configured to store data;

a DMA configured to transfer data to the at least one data buffer by direct memory access; and a processing circuit configured to run a data compiling and transferring process that compiles control data from the data stored in the at least one data buffer and serially transfers the control data to the drive device based on the buffered data, wherein the processing circuit is configured to operate in a plurality of operating modes using different logic to compile the control data from the data stored in the at least one data buffer.

2. The motor control apparatus as described in claim 1, wherein the at least one data buffer comprises a plurality of data buffers, and the processing circuit comprises a decoder circuit configured to output a write enable signal to a particular data buffer, when the specific memory address corresponding to that data buffer is supplied to the decoder circuit, and the processing circuit comprises a sequencer circuit, each data buffer being configured to transfer data stored therein to the sequencer circuit when that data buffer receives the write enable signal.

3. The motor control apparatus as described in claim 1, wherein the processing circuit is triggered to start the data compiling and transferring process when data is written to the at least one data buffer.

4. The motor control apparatus as described in claim 3, wherein the at least one data buffer comprises a plurality of data buffers, a respective one for each of a plurality of types of data, and the processing circuit starts the data compiling and transferring process when any one of the types of data is written to its corresponding data buffer.

5. The motor control apparatus as described in claim 3, further comprising:

a flag setting circuit configured to set a transfer reservation flag for a particular data buffer to which data is written when data is written to that data buffer; and wherein the processing circuit is configured to start the data compiling and transferring process on data stored in the data buffer for which the transfer reservation flag is set when a present serial transfer of control data is completed.

6. The motor control apparatus as described in claim 5, further comprising:

a prioritizing circuit configured to set a priority sequence for multiple data buffers to which data has been written and transfer reservation flags have been set; and wherein the processing circuit is configured to start the data compiling and transferring process on data stored in the data buffer having the highest priority as specified by the prioritizing circuit.

7. The motor control apparatus as described in claim 6, further comprising a priority setting circuit configured to set the priority sequence specified by the prioritizing circuit.

8. The motor control apparatus as described in claim 1, wherein the data stored in the data buffers and the control data compiled therefrom each comprise a plurality of bits, wherein there is a predefined correlation between the positions of the bits of the data in the data buffers and the positions of the bits of the control data, and the processing circuit compiles the control data based on the correlation.

9. The motor control apparatus as described in claim 1, wherein at least one data buffer is provided for each motor being driven by the drive device.

10. The motor control apparatus as described in claim 9, wherein the processing circuit comprises a selection signal circuit configured to send to the drive device a selection signal for specifying the motor corresponding to the data buffer to which data is written.

11. The motor control apparatus as described in claim 1, wherein the motor control apparatus further comprises a mode setting circuit configured to set the operating mode of the processing circuit.

12. The motor control apparatus as described in claim 1, wherein the motor is a stepping motor, and the control data includes data representing the phase pattern of voltage applied to the stepping motor.

13. A motor control method for serially transferring to a drive device adapted to drive one or more motors control data for controlling the one or more motors, the method comprising the steps of:

transferring data by direct memory access to at least one data buffer that stores data; and running a data compiling and transferring process that compiles control data from the data stored in the at least one data buffer and serially transfers the control data to the drive device based on the buffered data, wherein the data compiling and transferring process operates in a plurality of operating modes using different logic to compile the control data from the data stored in the at least one data buffer.

14. The motor control method as described in claim 13, wherein the start of the data compiling and transferring process is triggered by data being written to the at least one data buffer.

15. The motor control method as described in claim 14, wherein the at least one data buffer comprises a plurality of data buffers, a respective one for each of a plurality of types of data, and the data compiling and transferring process is started when any one of the types of data is written to its corresponding data buffer.

* * * * *

UNITED STATES PATENT AND TRADEMARK OFFICE
CERTIFICATE OF CORRECTION

PATENT NO. : 6,847,180 B2
DATED : January 25, 2005
INVENTOR(S) : Toshiki Takei

It is certified that error appears in the above-identified patent and that said Letters Patent is hereby corrected as shown below:

Title page,
Item [56], References Cited, U.S. PATENT DOCUMENTS, add
-- 5,272,430 12/1993 Bourgeois et al.
  5,710,721  1/1998 Rieckhoff et al. --

Signed and Sealed this

Tenth Day of May, 2005

JON W. DUDAS
*Director of the United States Patent and Trademark Office*